United States Patent
Park

(10) Patent No.: US 9,029,006 B2
(45) Date of Patent: May 12, 2015

(54) COUPLING STRUCTURE FOR ELECTRODE TABS OF SECONDARY BATTERY AND SECONDARY BATTERY USING THE SAME

(75) Inventor: Seong-Ah Park, Yongin-Si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 645 days.

(21) Appl. No.: 12/982,789

(22) Filed: Dec. 30, 2010

(65) Prior Publication Data

US 2011/0311859 A1      Dec. 22, 2011

(30) Foreign Application Priority Data

Jun. 17, 2010  (KR) ................. 10-2010-0057672

(51) Int. Cl.
| | |
|---|---|
| *H01M 2/26* | (2006.01) |
| *H01M 2/02* | (2006.01) |
| *H01M 2/06* | (2006.01) |
| *H01M 2/30* | (2006.01) |
| *H01M 10/052* | (2010.01) |

(52) U.S. Cl.
CPC .............. *H01M 2/266* (2013.01); *H01M 2/021* (2013.01); *H01M 2/0212* (2013.01); *H01M 2/024* (2013.01); *H01M 2/06* (2013.01); *H01M 2/30* (2013.01); *H01M 10/052* (2013.01); *Y02E 60/122* (2013.01)

(58) Field of Classification Search
CPC .......................................... H01M 2/26–2/266
USPC .......................................... 429/161, 162, 152
See application file for complete search history.

(56) References Cited

U.S. PATENT DOCUMENTS

| | | | | |
|---|---|---|---|---|
| 4,098,966 | A | * 7/1978 | Brown ........................ | 429/161 |
| 5,503,948 | A | * 4/1996 | MacKay et al. ............. | 429/152 |
| 2004/0028999 | A1 | * 2/2004 | Richard et al. .............. | 429/149 |
| 2009/0104518 | A1 | 4/2009 | Nedelec et al. | |
| 2009/0169991 | A1 | 7/2009 | Yeh | |
| 2009/0176155 | A1 | * 7/2009 | Choi ............................ | 429/178 |

FOREIGN PATENT DOCUMENTS

| | | |
|---|---|---|
| CN | 201112964 Y | 9/2008 |
| EP | 0 199 476 | 10/1986 |
| EP | 2 337 106 A2 | 6/2011 |
| JP | 08-167407 | 6/1996 |
| JP | 08-167408 | 6/1996 |

(Continued)

OTHER PUBLICATIONS

IDPL Machine Translation of JP 08-167407 A, retrieved Jul. 15, 2013.*

(Continued)

*Primary Examiner* — Barbara Gilliam
*Assistant Examiner* — Robert S Carrico
(74) *Attorney, Agent, or Firm* — Knobbe Martens Olson & Bear LLP

(57) ABSTRACT

A coupling structure for electrode tabs of a stacked-type secondary battery and a secondary battery using the same are disclosed. A coupling structure for electrode tabs of a secondary battery comprises: an electrode assembly formed by stacking a plurality of electrode plates; a tab portion formed by stacking electrode tabs protruding from one side of the electrode plates of the electrode assembly; and a coupling member that surrounds an outer surface of the tab portion so that the electrode tabs of the tab portion are connected to one another.

11 Claims, 4 Drawing Sheets

(56) References Cited

FOREIGN PATENT DOCUMENTS

| JP | 2005-116429 | 4/2005 |
|----|-------------|--------|
| KR | 10-2006-0033642 | 4/2006 |
| KR | 2007-0098790 | 10/2007 |
| KR | 10-2008-0014508 | 2/2008 |

OTHER PUBLICATIONS

KIPO Machine Translation of KR 10-2006-0033642 A, retrieved Aug. 9, 2013.*
Korean Office Action dated Sep. 25, 2011 in Application No. 10 2010-0057672.
Office Action dated Feb. 14, 2012 for corresponding KR Application No. 10-2010-0057672.
Extended European Search Report dated Sep. 16, 2011 for corresponding EP Application No. 11164698.0.
Office Action dated Dec. 18, 2012 for corresponding JP Application No. 2010-237305.
Office Action dated Aug. 20, 2013 for corresponding Chinese Patent Application No. 201110026674.5.

* cited by examiner ized embodiments of the present invention.

COUPLING STRUCTURE FOR ELECTRODE TABS OF SECONDARY BATTERY AND SECONDARY BATTERY USING THE SAME

RELATED APPLICATIONS

This application claims priority to and the benefit of Korean Patent Application No. 10-2010-0057672, filed on Jun. 17, 2010, in the Korean Intellectual Property Office, the entire content of which is incorporated herein by reference.

BACKGROUND

1. Field

The present technology relates to a coupling structure for electrode tabs of a secondary battery and a secondary battery using the same.

2. Description of the Related Technology

A secondary battery is a device that converts chemical energy generated by an electrical reaction into electrical energy. Unlike primary batteries, secondary batteries are rechargeable and have high voltage and current density. Thus, secondary batteries are widely used in electric appliances such as portable terminals.

Among these secondary batteries, a lithium secondary battery basically has a structure in which electrode plates are stacked so as to secure a suitable output factor.

Specifically, in the state in which a plurality of negative electrode plates and a plurality of positive electrode plates are alternately stacked, positive and negative electrode tabs are extracted from the respective positive and negative electrode plates, and the positive or negative electrode tabs are also stacked with one another.

Since the positive or negative electrode tabs are simply stacked with one another but separated from one another, they are connected to one another through a separate process.

The connection between positive or negative electrode tabs is typically made using an ultrasonic welding method. However, a large-capacity battery has a large number of positive and negative electrode tabs, and is thick in thickness. Hence, when the positive or negative electrode tabs are connected using only the ultrasonic welding method, it can be difficult to obtain a suitable fastening force, and operational efficiency may be lowered due to a long welding time.

In order to solve such a problem, a riveting connection method has recently been proposed in which positive or negative electrode tabs are connected to one another by &liming through-holes on the same line in positive or negative electrode tabs, and then inserting a separate rivet into the through-holes.

However, in such a method, the through-holes typically must be formed individually in each of the positive or negative electrode tabs. Therefore, the operation of the method can be inconvenient and the operational time can be increased.

SUMMARY

In one embodiment, a coupling structure for electrode tabs of a stacked-type secondary battery is provided, in which electrode tabs are connected to one another without a separate processing method for connecting the electrode tabs, thus making possible reducing the inconvenience of a coupling operation and increasing the fastening force among the electrode tabs.

According to an aspect of the present invention, a coupling structure for electrode tabs of a secondary battery is provided, the coupling structure comprising: an electrode assembly formed by stacking a plurality of electrode plates; a tab portion formed by stacking electrode tabs protruding from one side of the electrode plates of the electrode assembly; and a coupling member that surrounds an outer surface of the tab portion so that the electrode tabs of the tab portion are connected to one another.

The coupling member may have a frame structure including an upper cover portion that surrounds a top surface of the tab portion, side cover portions extending from each side of opposite sides of the upper cover portion to surround each side of opposite sides of the tab portion, and lower cover portions extending from each of the side cover portions to surround a bottom surface of the tab portion.

Bent portions may be formed at ends of each of the lower cover portions, wherein the bent portions face each other and bend upwards, and the tab portion is mounted on the bent portions.

The bent portion may overlap the lower cover portions on an upper surface of the lower cover portions.

Both end portions of the bent portions may be bent toward the side cover portions.

The bent portions and the lower cover portions may be stacked into a multiple-layered structure.

A tab protecting member may be formed on an inner surface of the coupling member and a surface of the tab portion.

The tab portion positioned in the coupling member may be formed in an arc shape.

Each of the electrode tabs of the tab portion may include positive and negative electrode tab portions positioned at an interval on each of the electrode plates, and wherein the coupling member may include a first coupling member that surrounds the positive electrode tab portion and a second coupling member connected to the first coupling member to surround the negative electrode tab portion.

The first and second coupling members may be connected to each other through a connection cover piece.

The connection cover piece may have a bent portion.

The portions of the first and second coupling members that respectively surround the positive and negative electrode tab portions of the first and second coupling members may have a circular or arc shape.

A tab protecting member may be formed between the first and second coupling members and the positive and negative electrode tab portions.

According to an aspect of the present invention, there is provided a coupling structure for electrode tabs of a secondary battery, the coupling structure including: an electrode assembly formed by stacking a plurality of electrode plates; positive and negative electrode tab portions formed by stacking positive and negative electrode tabs protruding from one sides of the electrode plates of the electrode assembly; large-current tab portions attached to one end of the positive and negative electrode tab portions; and a coupling member that surrounds an outer surface of at least one coupling portion of the positive electrode tab portion, the negative electrode tab portion and large-current tab portions so that the electrode tabs of each of the tab portions are connected to one another.

A tab protecting member may be formed on an inner surface of the coupling member.

The coupling member may further include a separate coupling member that surrounds one or more outer surfaces of the positive and negative electrode tab portions.

According to an aspect of the present invention, there is provided a secondary battery including: an electrode assembly formed by stacking a plurality of electrode plates; positive and negative electrode tab portions each having the coupling member according to any one of the above described embodiments, the positive and negative electrode tab portions being formed by stacking positive and negative electrode tabs protruding from one sides of the electrode plates of the electrode assembly; and a housing that accommodates the electrode assembly such that the positive and negative electrode tab portions are protruding to the exterior of the housing.

As described above, according to embodiments of the present invention, a coupling member is formed to surround an entire tab portion having stacked electrode tabs without performing a separate processing for connecting the electrode tabs, so that it is possible to simplify the coupling operation and to obtain a high fastening force.

BRIEF DESCRIPTION OF THE DRAWINGS

The accompanying drawings, together with the specification, illustrate certain embodiments of the present invention, and, together with the description, serve to explain principles of the present invention.

DETAILED DESCRIPTION

Figure 1:
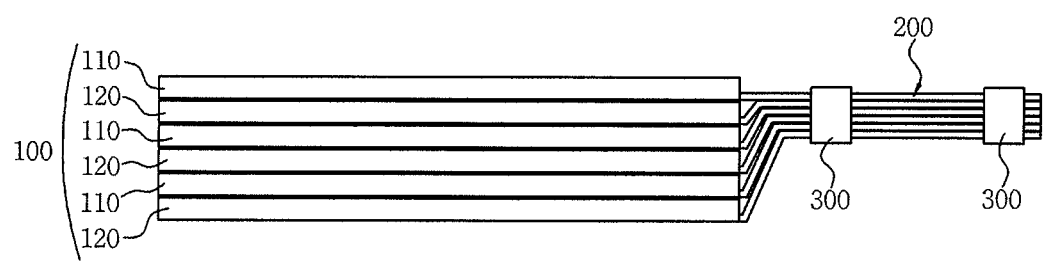
FIG. 1 is a side schematic view showing the stacked structure of electrode plates and electrode tabs and the formation state of coupling members, according to one embodiment.

In the following detailed description, certain embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. In addition, when an element is referred to as being "on" another element, it can be directly on another element or indirectly on another element with one or more intervening elements interposed therebetween. Also, when an element is referred to as being "connected to" another element, it can be directly connected to another element or indirectly connected to another element with one or more intervening elements interposed therebetween. Hereinafter, like reference numerals refer to like elements. In the drawings, the thickness or size of layers are exaggerated for clarity and not necessarily drawn to scale.

Figure 2:
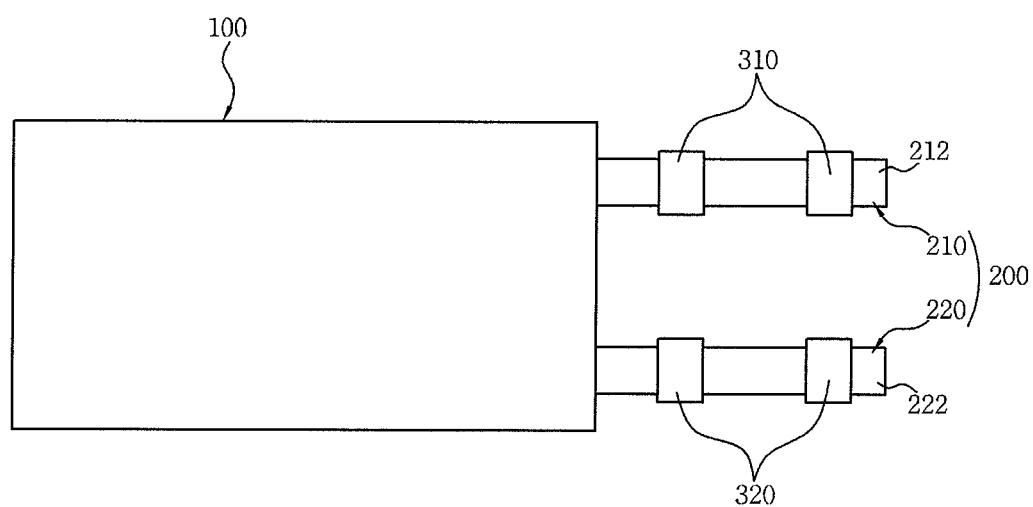
FIG. 2 is a plan schematic view showing the state in which the coupling members are formed at each tab portion.

As shown in FIGS. 1 and 2, a stacked-type secondary battery according to an embodiment of the present invention includes an electrode assembly 100 formed by stacking a plurality of electrode layers, and a plurality of tab portions 200. In this embodiment, the electrode assembly 100 has a structure in which positive and negative electrode plates 110 and 120 are alternately stacked. In this embodiment, the number of the stacked first and second electrode plates 110 and 120 may be varied according to the output power of the secondary battery to be manufactured.

The plurality of tab portions 200 may be formed on one side of the electrode assembly 100 with a structure in which the positive and negative electrode plates 110 and 120 are stacked as described above. The tab portions 200 may be used to collect current generated from the electrode assembly, and include positive and negative electrode tab portions 210 and 220.

The positive electrode tab portion 210 may function as collecting current generated from each of the positive electrode plates 110. The positive electrode tab portion 210 can have a structure in which positive electrode tabs 212 having a thin plate shape are connected to one end portion of the positive electrode plates 110 and stacked with one another.

The negative electrode tab portion 220 may function as collecting current generated from each of the negative electrode plates 120. The negative electrode tab portion 220 may have a structure in which negative electrode tabs 222 having a thin plate shape identical to that of the positive electrode tabs 212 are connected to one end portion of the negative electrode plates 120, and stacked with one another.

As the tab portions 200 are formed into such a structure, the positive and negative electrode tab portions 210 and 220 may be arranged with an interval at both end portions of one side of the electrode assembly 100.

In this embodiment, coupling members are provided to the positive and negative electrode tab portions 210 and 220 of each of the plurality of tab portions 200.

The coupling members 300 may function as connecting the positive electrode tabs 212 of the positive electrode tab portion 210 to one another and as connecting the negative electrode tabs 222 of the negative electrode tab portion 220 to one another. The coupling members 300 may include first and second coupling members 310 and 320.

Figure 3:
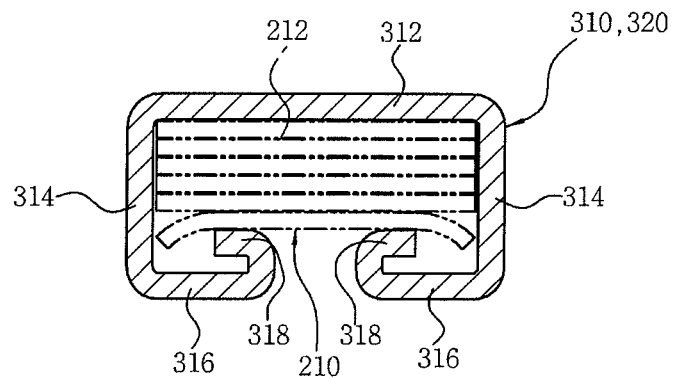
FIG. 3 is a sectional schematic view showing the structure of a coupling member and the connection structure of electrode tabs through the coupling member.

The first coupling member 310 may be used to connect the positive electrode tabs 212 to one another. The first coupling member 310 may be entirely formed into a metal frame structure. As shown in FIG. 3, the first coupling member may be formed to surround the entire positive electrode portion 210 at the outside of the positive electrode portion 210.

Specifically, an upper cover piece 312 for covering a top surface of the positive electrode tab portion 210 may be positioned on the top surface of the positive electrode tab portion 210, and side cover pieces 314 may be bent to extend downward at both ends of the upper cover piece 312 to surround both sides of the positive electrode tab portion 210.

In addition, lower cover pieces 316 may be bent to extend toward each other at ends of the side cover pieces 314 to surround a bottom surface of the positive electrode tab portion 210.

As the first coupling member 310 is formed to surround the entire circumference of the positive electrode tab portion 210, the positive electrode tab portion 210 may be bound by the first coupling member 310, thereby maintaining the stacked state of the positive electrode tabs 212.

As shown in FIG. 3, bent pieces 318 may be further formed to extend upward at ends of the lower cover pieces 316, which face each other, so as to contact the bottom surface of the positive electrode tab portion 210. Thus, the positive electrode tab portion 210 can be safely mounted on the bent pieces 318.

In such a structure in which the bottom surface of the positive electrode tab portion 210 is surrounded by only the lower cover pieces 316, the gap between the lower cover pieces 316 can be widened due to the self-weight of the positive electrode tab portion 210, and therefore, the positive electrode tab portion 210 may be slipped out of the gap between the lower cover pieces 316.

However, as the bent pieces 318 are formed to erect vertically from the ends of the respective lower cover pieces 316, the weight load of the positive electrode tab portion 210 can be primarily supported in the vertical direction by the bent pieces 318. Thus, it is possible to minimize widening of the gap between the lower cover pieces 316 due to the load distribution.

The bent pieces 318 may be formed into a structure in which they are stacked on the upper surfaces of the lower cover pieces 316 for the purpose of load distribution. However, a short circuit between the bent pieces 318 may occur due to contact with an external object.

Figure 4:
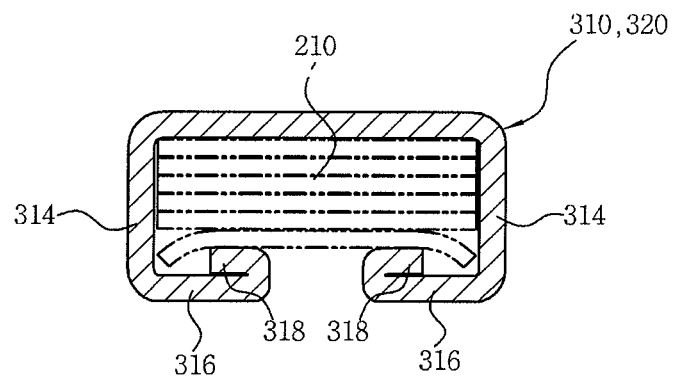
FIGS. 4 to 7 are sectional schematic views showing modifications of the structure of the coupling member.

As shown in FIG. 4, the bent pieces 318 may be stacked on the upper surfaces of the lower cover pieces 316. In this case, the strength of the lower cover pieces 316 can be reinforced, and the finishing shape of the ends of the lower cover pieces 316 can be simplified.

Alternatively, the bent piece 318 and the lower cover piece 316 may be stacked into a double-layered structure, or the bent piece 318 may be repeatedly formed so that the bent pieces 318 and the lower cover piece 316 are stacked into a triple or more-layered structure.

Figure 5:
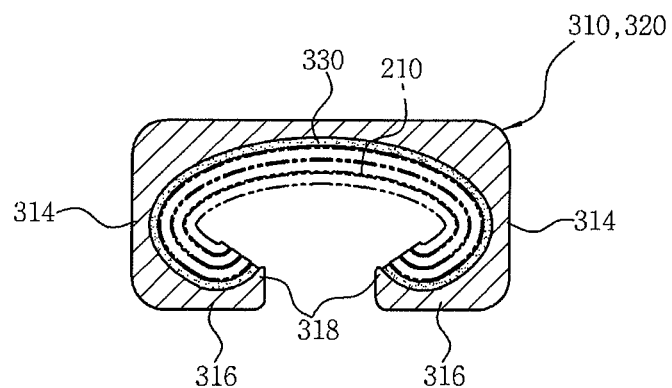

As shown in FIG. 5, the entire coupling member 300 may be formed in the shape of an arc so that the positive electrode tab portion 210 is also formed in the shape of an arc when the coupling member 300 surrounds the positive electrode tab portion 210, thereby increasing the fastening efficiency between the positive electrode tab portion 210 and the coupling member 300.

In addition, a separate tab protecting member 330 may be formed on an inner surface of the first coupling member 310 regardless of the shape of the first coupling member 310, so that it is possible to prevent the surface of a corresponding electrode tab from being damaged by contact between the first coupling member 310 and the corresponding electrode tab.

In this embodiment, a synthetic resin tape or the like is used as the tab protecting member 330, so that it is possible to prevent a short circuit and to minimize the damage of the surface of the electrode tab.

The second coupling member 320 formed at the negative electrode tab portion 220 may be used to connect the negative electrode tabs 222 of the negative electrode tab portion 220 to one another. The second coupling member 320 may be formed into the same structure of the first coupling member 310 to surround the negative electrode tab portion 220 at the outside of the negative electrode tab portion 220.

Thus, the negative electrode tab portion 220 may be bound by the second coupling member 320, thereby maintaining the stacked state of the negative electrode tabs 222.

The shape of the second coupling member 320 may also be varied with the same shape as the first coupling member 310. The second coupling member 320 may be provided with a tab protecting member 330.

The positive and negative electrode tab portions 210 and 220 extracted from the electrode assembly 100 by the first and second coupling members 310 and 320 may be bound as bundles.

As described above, the electrode tabs may be connected to one another by surrounding the entire tab portion at the outside of the tab portion without separate welding or machining of the electrode tabs, so that it is possible to simplify a coupling operation and to prevent a coupling portion from being broken by external impact.

For reference, a plurality of coupling members 300 may be provided to each of the positive and negative electrode tab portions 310 and 320 as shown in FIGS. 1 and 2. In this case, it is possible to reinforce the entire strength.

Figure 6:
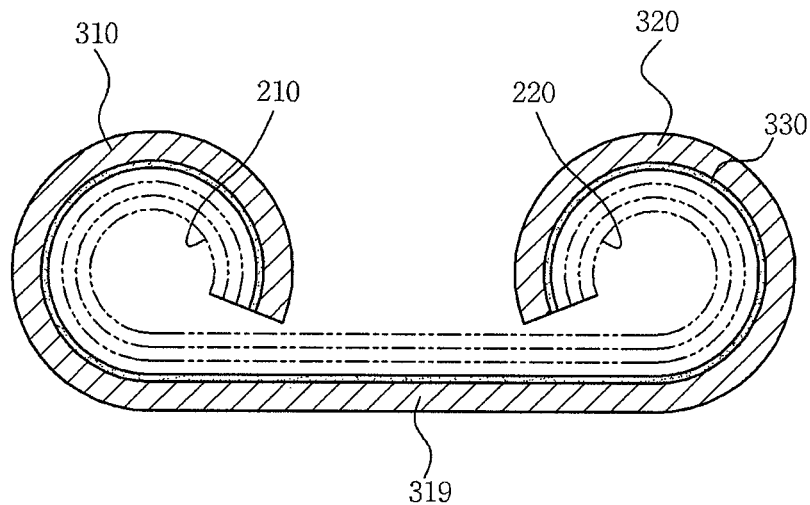

FIG. 6 is a view showing still another embodiment. Unlike the aforementioned embodiment in which the coupling members 300 are respectively provided to the positive and negative electrode tab portions 210 and 220, one coupling member 300 may simultaneously surround the positive and negative electrode tab portions 210 and 220 so as to connect the positive and negative electrode tab portions 210 and 220 to each other.

To this end, the coupling member 300 may include a first coupling member 310 that surrounds the positive electrode tab portion 210 and a second coupling member 320 that surrounds the negative electrode tab portion 220 as described in the aforementioned embodiment. A connection cover piece 319 that connects the first and second coupling members 310 and 320 to each other may be further formed between the first and second coupling members 310 and 320.

More specifically, in an embodiment in which the first and second coupling members 310 and 320 are formed to surround the positive and negative electrode tab portions 210 and 220 toward top surfaces from bottom surfaces of the positive and negative electrode tab portions 210 and 220, respectively, both ends of the connection cover piece 319 positioned between the first and second coupling members 310 and 320 can be connected to the first and second coupling members 310 and 320, respectively.

Thus, the coupling member 300 can connect the positive and negative electrode tab portions 210 and 220 to each other through the connection cover piece 319 while individually surrounding the positive and negative electrode tab portions 210 and 220.

In this embodiment, a separate tab protecting member 330 may be provided to the inner circumferential surfaces of the first and second coupling members 310 and 320 and the connection cover piece 319, so that it is possible to prevent a short circuit and to prevent damage of the surfaces of the positive and negative electrode tabs 212 and 222.

For reference, in the embodiment shown in FIG. 6, the coupling members 310 and 320 have a circular shape, and the positive and negative electrode tab portions 210 and 220 are modified to have a shape corresponding to the circular shape. However, the shape of the coupling members 310 and 320 may be applied to that shown in FIGS. 1, 2 and 3.

Figure 7:
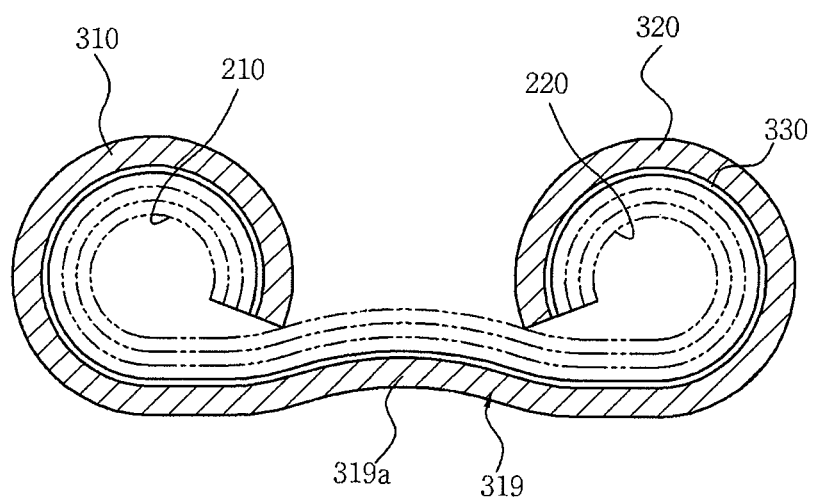

As shown in FIG. 7, a bent portion 319a may be formed at the connection cover piece 319, so that it is possible to reinforce the self-strength of the connection cover piece 319 and to enhance the entire fixing force of the coupling members 310 and 320.

A plurality of first coupling members 310 and a plurality of second coupling members 320, which have such a shape, can be formed on the positive and negative electrode tab portions 210 and 220, respectively, so that the fastening force of the electrode tab portions can be more enhanced.

Figure 8:
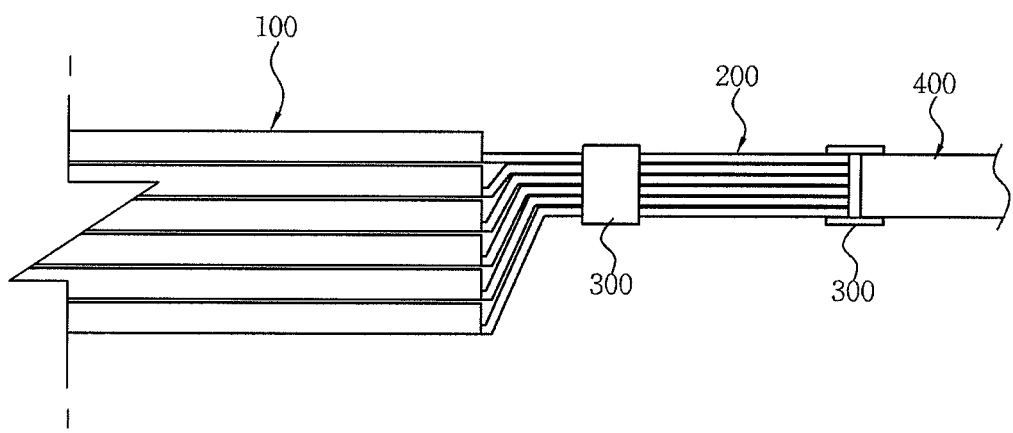
FIG. 8 is a side schematic view showing the stacked structure of electrode plates and electrode tabs and the formation state of coupling members, according to another embodiment.

FIG. 8 is an illustration of another embodiment. Coupling members 300 may function as connecting electrode tabs to one another while surrounding a tab portion 200, and as connecting the tab portion 200 and a large-current tab 400 to each other.

In this case, one half side of one coupling member 300 may surround the tab portion 200, and the other half side of the one coupling member 300 may surround the large-current tab 400. Therefore, the tab portion 200 and the large-current tab 400 can be connected to each other by the medium of the one coupling member 300.

Thus, the welding process between the tab portion 200 and the large-current tab 400 may be omitted, and accordingly, it can be possible to simplify the coupling operation and to reinforce the entire strength.

In this embodiment, the coupling member 300 performs the conducting function between the tab portion 200 and the large-current tab 400. Therefore, the coupling member 300 may be formed of a metallic material.

As described above, electrode tabs that constitute a tab portion may be connected to one another by simply surrounding the entire tab portion using a coupling member without separate welding or machining operation, so that it is possible to simplify a coupling operation and to reinforce the entire strength.

Various features of the present invention described above may be modified and combined by those skilled in the art. Embodiments may provide various modifications of a coupling structure in which a coupling member connects electrode tabs connected and stacked in a stacked-type electrode assembly while surrounding the electrode tabs at the outside of the electrode tabs. Therefore, when the modifications and combinations are related to configurations in which it is possible to simplify a coupling operation and to reinforce the entire strength, they may be included in the scope of the present invention.

While the present invention has been described in connection with certain embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A coupling structure for electrode tabs of a secondary battery, the coupling structure comprising:
    an electrode assembly formed by stacking a plurality of electrode plates;
    a tab portion formed by stacking electrode tabs protruding from one side of the electrode plates of the electrode assembly; and
    a coupling member that is separate from the tab portion that surrounds an outer surface of the tab portion about a plurality of sides of the tab portion so that the electrode tabs of the tab portion are connected to one another wherein the coupling member has ends that define end portions and bent portions which are formed at the ends of the end portions of the coupling member wherein the bent portions face each other and bend upwards and wherein a surface of the bent portions is positioned on and in contact with a surface of the end portions and the tab portion is mounted on the bent portions so that the electrode plates are spaced from the end portions of the coupling member.

2. The coupling structure according to claim 1, wherein the coupling member has a frame structure comprising an upper cover portion that surrounds a top surface of the tab portion, side cover portions extending from each side of opposite sides of the upper cover portion to respectively surround each side of opposite sides of the tab portion, and lower cover portions extending from each of the side cover portions to surround a bottom surface of the tab portion.

3. The coupling structure according to claim 2, wherein the bent portions overlap the lower cover portions on an upper surface of the lower cover portions.

4. The coupling structure according to claim 2, wherein the end portions of the bent portions are bent toward the side cover portions.

5. The coupling structure according to claim 2, wherein the bent portions and the lower cover portions are stacked into a multiple-layered structure.

6. The coupling structure according to claim 2, wherein a tab protecting member is formed on an inner surface of the coupling member and a surface of the tab portion.

7. The coupling structure according to claim 1, wherein each of the electrode tabs of the tab portion comprises positive and negative electrode tab portions positioned at an interval on each of the electrode plates, and wherein the coupling member comprises a first coupling member that surrounds the positive electrode tab portion and a second coupling member connected to the first coupling member to surround the negative electrode tab portion.

8. A secondary battery comprising:
    an electrode assembly formed by stacking a plurality of electrode plates;
    positive and negative electrode tab portions each having the coupling structure according to claim 1, the positive and negative electrode tab portions being formed by stacking positive and negative electrode tabs protruding from one side of the electrode plates of the electrode assembly; and
    a housing that accommodates the electrode assembly such that the positive and negative electrode tab portions are protruded to an exterior of the housing.

9. The secondary battery according to claim 8, wherein large-current tab portions are connected to one end of the positive and negative electrode tab portions.

10. A coupling structure for electrode tabs of a secondary battery, the coupling structure comprising:
    an electrode assembly formed by stacking a plurality of electrode plates;
    positive and negative electrode tab portions respectively formed by stacking positive and negative electrode tabs protruding from one side of the electrode plates of the electrode assembly;
    large-current tab portions attached to one end of the positive and negative electrode tab portions; and
    a coupling member that is separate from the tab portions that surrounds a plurality of outer surfaces of at least one of the positive electrode tab portion, the negative electrode tab portion and large-current tab portions so that the electrode tabs of each of the tab portions are connected to one another wherein the coupling member has ends that define end portions and bent portions which are formed at the ends of the end portions each of the coupling portions wherein the bent portions face each other and bend upwards and wherein a surface of the bent portions is positioned on and in contact with a surface of the end portions and the tab portion is mounted on the bent portions so that the electrode plates are spaced from the end portions of the coupling member.

11. The coupling structure according to claim 10, wherein a tab protecting member is formed on an inner surface of the coupling member.

* * * * *